United States Patent
Morishita

(10) Patent No.: US 10,808,769 B2
(45) Date of Patent: Oct. 20, 2020

(54) CLUTCH DEVICE AND STRADDLE-TYPE VEHICLE AND VEHICLE PROVIDED WITH SAME

(71) Applicant: YAMAHA HATSUDOKI KABUSHIKI KAISHA, Iwata-shi, Shizuoka-ken (JP)

(72) Inventor: Shoichiro Morishita, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 140 days.

(21) Appl. No.: 15/965,041

(22) Filed: Apr. 27, 2018

(65) Prior Publication Data

US 2018/0313413 A1 Nov. 1, 2018

(30) Foreign Application Priority Data

Apr. 28, 2017 (JP) .................................. 2017-089562

(51) Int. Cl.
*F16D 13/56* (2006.01)

(52) U.S. Cl.
CPC ........ *F16D 13/56* (2013.01); *F16D 2013/565* (2013.01)

(58) Field of Classification Search
CPC ......... F16D 2013/565; F16D 13/52–56; F16D 43/216

See application file for complete search history.

(56) References Cited

U.S. PATENT DOCUMENTS

| 2,587,712 A | 3/1952 | Dodge | |
|---|---|---|---|
| 8,469,169 B2* | 6/2013 | Nakamura | F16D 13/52 192/54.5 |
| 8,662,233 B2* | 3/2014 | Saitoh | F16H 3/006 180/226 |
| 9,580,060 B2* | 2/2017 | Nonaka | F16D 13/54 |
| 10,253,825 B2* | 4/2019 | Imanishi | F16D 13/52 |
| 10,302,149 B2* | 5/2019 | Imanishi | F16D 13/52 |
| 2011/0061985 A1 | 3/2011 | Nakamura et al. | |

FOREIGN PATENT DOCUMENTS

| EP | 2799734 A1 | 11/2014 |
|---|---|---|
| JP | H07-023062 B2 | 3/1995 |
| JP | 2005-98454 A | 4/2005 |
| JP | 2007-032822 A | 2/2007 |

(Continued)

*Primary Examiner* — Ernesto A Suarez
*Assistant Examiner* — James J Taylor, II
(74) *Attorney, Agent, or Firm* — Rabin & Berdo, P.C.

(57) ABSTRACT

A clutch includes a driving section configured to rotate by receiving torque, a driven section configured to rotate integrally with an output shaft, a driving-side frictional member held in the driving section, a driven-side frictional member held in the driven section, a pressure section configured to press the driving-side frictional member and the driven-side frictional member into contact with each other, and a forward driving direction torque limiter configured to limit an excess of a transmission torque to be transmitted in a direction to accelerate the output shaft beyond an upper limit value, by moving the driving-side frictional member and the driven-side frictional member in directions away from each other in response to an increase of the transmission torque.

11 Claims, 7 Drawing Sheets

(56) References Cited

FOREIGN PATENT DOCUMENTS

| | | |
|---|---|---|
| JP | 4223461 B2 | 2/2009 |
| JP | 4744417 B2 | 8/2011 |
| JP | 4872289 B2 | 2/2012 |
| JP | 5879094 B2 | 3/2016 |
| JP | 2016-145626 A | 8/2016 |
| WO | WO 98/40638 A1 | 9/1998 |

\* cited by examiner

CLUTCH DEVICE AND STRADDLE-TYPE VEHICLE AND VEHICLE PROVIDED WITH SAME

CROSS REFERENCE TO RELATED APPLICATION

The disclosure of Japanese Patent Application No. 2017-89562 filed on Apr. 28, 2017 including specification, drawings and claims is incorporated herein by reference in its entirety. The benefit of the earlier filing date of the noted application is hereby claimed.

BACKGROUND OF THE INVENTION

1. Field of the Invention

This invention relates to a clutch device provided in a torque transmission path for transmitting a torque generated by a drive source to a drive wheel and configured to switch the transmission and cut-off of the torque and a straddle-type vehicle and a vehicle equipped with the clutch device.

2. Description of the Related Art

During normal travel of a straddle-type vehicle such as a motorcycle or a vehicle such as an ATV (All Terrain Vehicle), a torque (power) generated by an engine (drive source) is transmitted as an input torque T1 to a rear wheel (drive wheel) 200 via a torque transmission path 100, for example, as shown in a field (a) of FIG. 6. A clutch 300 is provided in the torque transmission path 100, and the input torque T1 is transmitted to the rear wheel side via the clutch 300. At this time, a torque T2 is transmitted as a transmission torque from the clutch 300 to the rear wheel side and applied to the rear wheel 200. The rear wheel 200 rotates by receiving this transmission torque T2. At that time, a load torque T4 is directly applied as a load torque T3 to the torque transmission path 100 to face the transmission torque T2 as shown by a dotted line arrow in FIG. 6. When the vehicle travels at a constant speed, the transmission torque T2 and the load torque T3 are balanced and a torsion of the torque transmission path 100 (chain double-dashed line in FIG. 6) falls within a range by the torque generated by an engine output.

Here, if a direction of a load (torsion) generated in the torque transmission path 100 when the rear wheel 200 is accelerated in a forward direction by the engine is a "forward driving direction", a shock torque may be generated in the forward driving direction according to an operating state of the straddle-type vehicle. For example, an excessive shock torque may be generated in the forward driving direction when jump landing is made. That is, in a jumping state, the rear wheel 200 departs from the ground surface or road, the load torque T3 becomes substantially zero and a crankshaft rotational speed of the engine increases. At the time of jump landing, a sudden deceleration torque T4 is input as an input torque to the rear wheel 200 as shown in a field (b) of FIG. 6. Due to this input torque T4, the load torque T3 becomes excessive and acts as a drive system load torque serving as a factor of sudden deceleration on the side of the engine, and this becomes a shock torque. This excessive shock torque may become several times as large as a torque generated by an engine output. If this is directly applied to the torque transmission path 100, components constituting the torque transmission path 100, e.g. the clutch 300 may be possibly broken. Accordingly, to solve this problem, it is being studied to damp an excessive torque by adding a cam damper described in Japanese Patents No. 4744417 and 4872289 and the like to the torque transmission path 100.

However, the cam damper damps a sudden variation of an input torque by combining a cam mechanism and a spring mechanism as known and has a characteristic as shown in FIG. 7. That is, in the cam damper, the above damping effect is effectively exhibited until the varying torque reaches an upper limit value Tmax, but there is no more damping effect and a shock torque directly becomes a drive system load torque after a transmission torque jumps to a value Tw corresponding to the upper limit value Tmax if the shock torque exceeding the upper limit value Tmax is input as shown in FIG. 7. As just described, there has been an upper limit to the torque value at which the shock torque in the forward driving direction can be reduced by the additional equipment of the cam damper. Further, the addition of the cam damper becomes one of main factors of the enlargement of a straddle-type vehicle and a cost increase. Furthermore, it is also a countermeasure to configure various devices provided in the torque transmission path to be able to withstand an excessive shock torque. However, this case also leads to the enlargement of the straddle-type vehicle and a cost increase.

Accordingly, it is desired to additionally give a function of reducing the above shock torque to some of the various devices provided in the torque transmission path, but no device having this function has conventionally existed.

SUMMARY OF THE INVENTION

This invention aims to provide a technology capable of effectively reducing a drive system load torque in response to a shock torque generated in a forward driving direction and avoiding the enlargement of a straddle-type vehicle and a cost increase.

One aspect of this invention is directed to a clutch device provided in a torque transmission path for transmitting a torque generated by a drive source to a drive wheel and configured to switch the transmission and cut-off of the torque, comprising: a driving section configured to rotate by receiving the torque; a driven section configured to rotate integrally with an output shaft; a driving-side frictional member held in the driving section; a driven-side frictional member held in the driven section; a pressure section configured to press the driving-side frictional member and the driven-side frictional member into contact with each other; and a forward driving direction torque limiter configured to limit an excess of a transmission torque to be transmitted in a direction to accelerate the output shaft beyond an upper limit value by moving the driving-side frictional member and the driven-side frictional member in directions away from each other in response to an increase of the transmission torque.

Further, another aspect of this invention is directed to a straddle-type vehicle such as a motorcycle or a vehicle such as an ATV including the clutch device.

In the above invention, the forward driving direction torque limiter is equipped in the clutch device provided in the torque transmission path. If a shock torque is generated in a forward driving direction, the transmission torque is going to exceed the upper limit value, but the forward driving direction torque limiter operates in response to that increase of the transmission torque. Specifically, the forward driving direction torque limiter limits an excess of the transmission torque beyond the upper limit value and reduces a drive system load torque in response to the shock torque by moving the driving-side frictional member and the driven-side frictional member in the directions away from each other.

Since an excess of the transmission torque beyond the upper limit value is limited by the forward driving direction torque limiter in this invention, a shock torque in the forward driving direction can be effectively reduced. Further, since this forward driving direction torque limiter is provided in the clutch device, it is no longer necessary to increase a transmission torque capacity of a device provided in the torque transmission path to withstand a shock torque. As a result, the enlargement of a straddle-type vehicle and a cost increase can be avoided.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION

Figure 1:
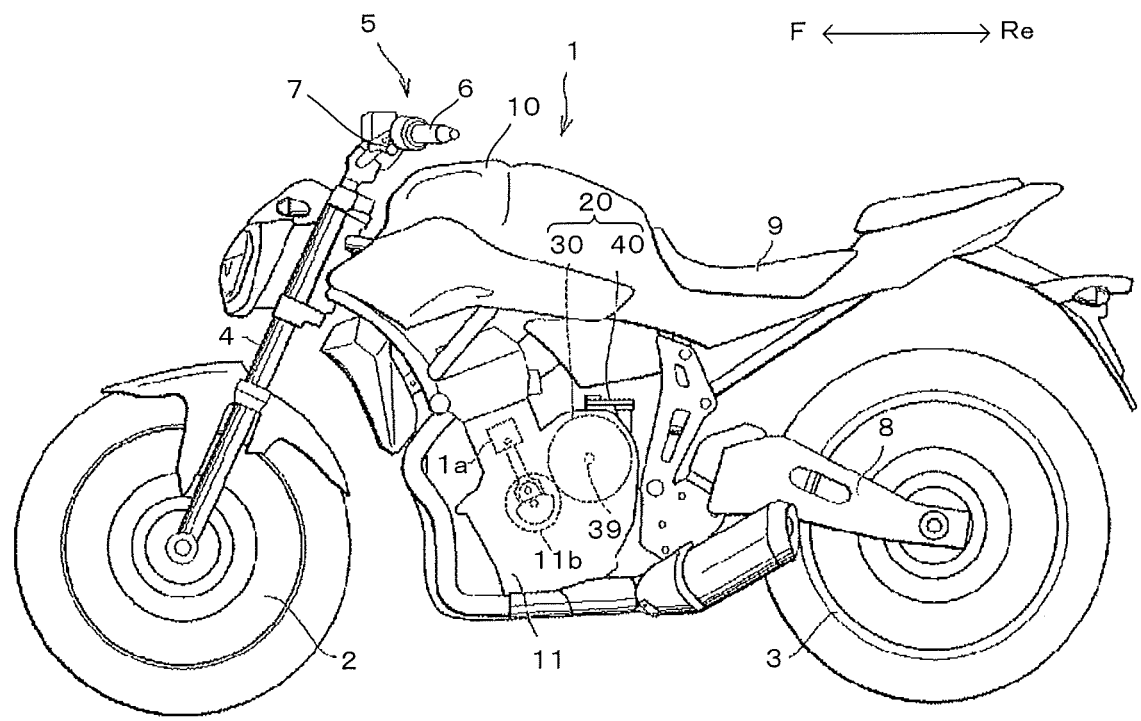
FIG. 1 is a side view showing a motorcycle as an example of a straddle-type vehicle equipped with a clutch device according to the invention.

FIG. 1 is a side view showing a motorcycle as an example of a straddle-type vehicle equipped with a clutch device according to the invention. The motorcycle 1 shown in FIG. 1 is of a so-called on-road type, but straddle-type vehicles also include motorcycles of an off-road type, a scooter type or a so-called moped type beside the above form. Further, the clutch device according to the invention is applicable not only to straddle-type vehicles, but also to vehicles such as ATVs and four-wheel buggies. Further, in this specification, front, rear, left and right sides respectively mean front, rear, left and right sides viewed from a passenger seated on a seat 9 to be described later. Further, F, Re in FIG. 1 respectively denote front and rear sides.

The motorcycle 1 includes a front wheel 2 and a rear wheel 3. The front wheel 2 is supported on a lower end of a front suspension 4. A steering handle 5 is attached to an upper part of the front suspension 4. A grip 6 and a clutch lever 7 are attached to one end of this handle 5. The passenger disconnects and connects a clutch 30 via a drive unit 40 by operating the clutch lever 7. On the other hand, unillustrated accelerator grip and brake lever are attached to the other end of the handle 5. Note that the front suspension 4 is rotatable about a steering shaft (not shown).

The rear wheel 3 is supported on the rear end of a rear arm 8. The front end of the rear arm 8 is supported on a pivot shaft (not shown) provided on a vehicle body frame. Thus, the rear wheel 3 is movable upward and downward about the pivot shaft.

Further, the seat 9 on which the passenger is seated is arranged in an upper part of the vehicle body frame. A fuel tank 10 is arranged forwardly of this seat 9 so that gasoline can be supplied to an engine unit 11.

The engine unit 11 is arranged between the front wheel 2 and the rear wheel 3. The engine unit 11 includes a piston 11a and a crankshaft 11b coupled to the piston 11a. Although the engine unit 11 is an internal combustion engine using gasoline as fuel as described above in this embodiment, the engine unit 11 may be an electric motor or the like without being limited to an internal combustion engine such as a gasoline engine. Further, the engine unit 11 may be a combination of a gasoline engine and an electric motor.

A transmission (not shown) and a clutch 30 for transmitting a torque of the crankshaft 11b to the transmission are arranged behind the engine unit 11. This clutch 30 is a constituent element of the clutch device 20 and operated by a driving unit 40. That is, the clutch device 20 is composed of the clutch 30 and the driving unit 40.

The clutch 30 is arranged on a main shaft 39. The clutch 30 includes a driving section integrally rotatable with the crankshaft 11b and a driven section configured to integrally rotate with the main shaft 39. The driving section is configured to be freely rotatable relative to the main shaft 30 as described in detail later. Further, the clutch 30 also includes a pressure member for pressing a frictional member so that the driving section and the driven section are engaged through the frictional member. On the other hand, the driving unit 40 includes a link mechanism configured to operate according to the operation of the clutch lever 7. This link mechanism is coupled to the pressure member. The configurations of these are described in detail below with reference to FIG. 2.

Figure 2:
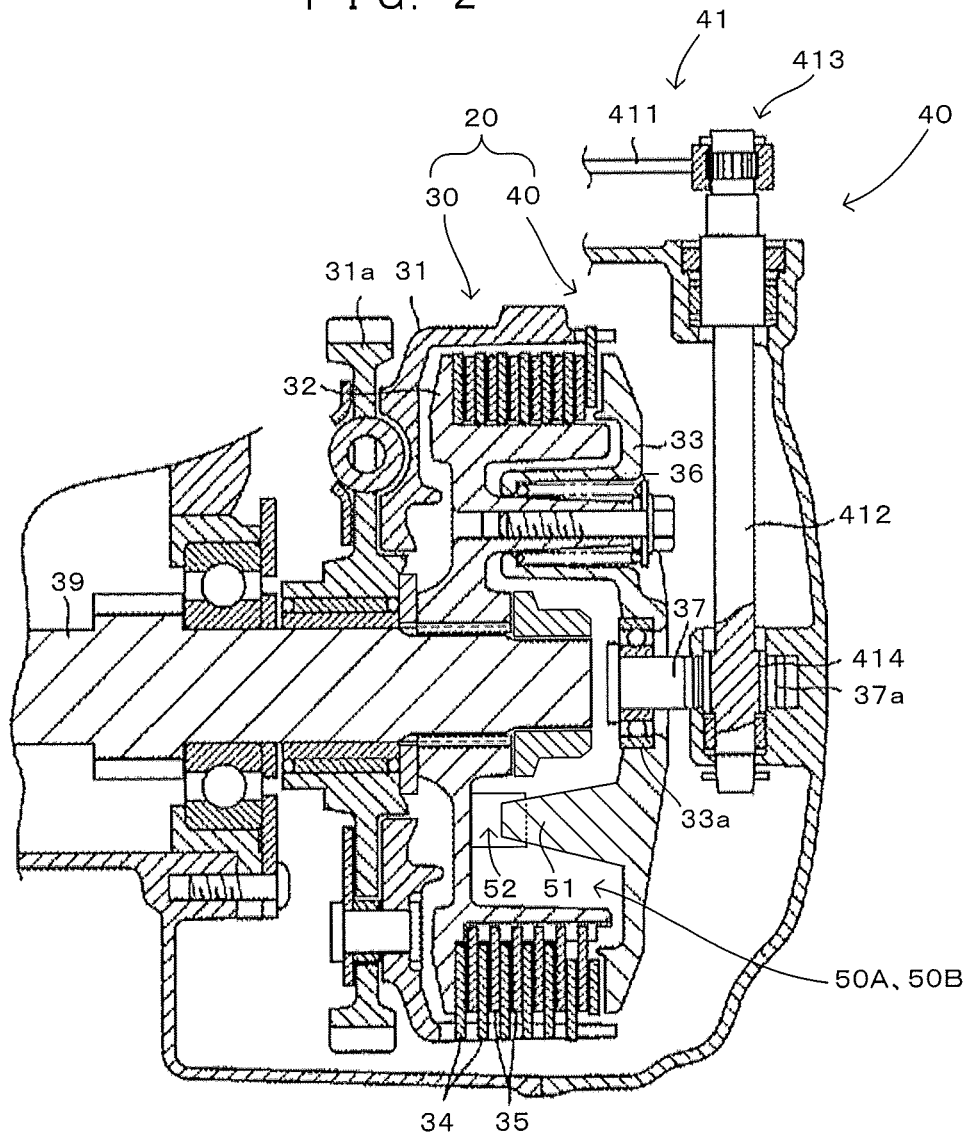
FIG. 2 is a sectional view showing one embodiment of the clutch device according to the invention.
Figure 3:
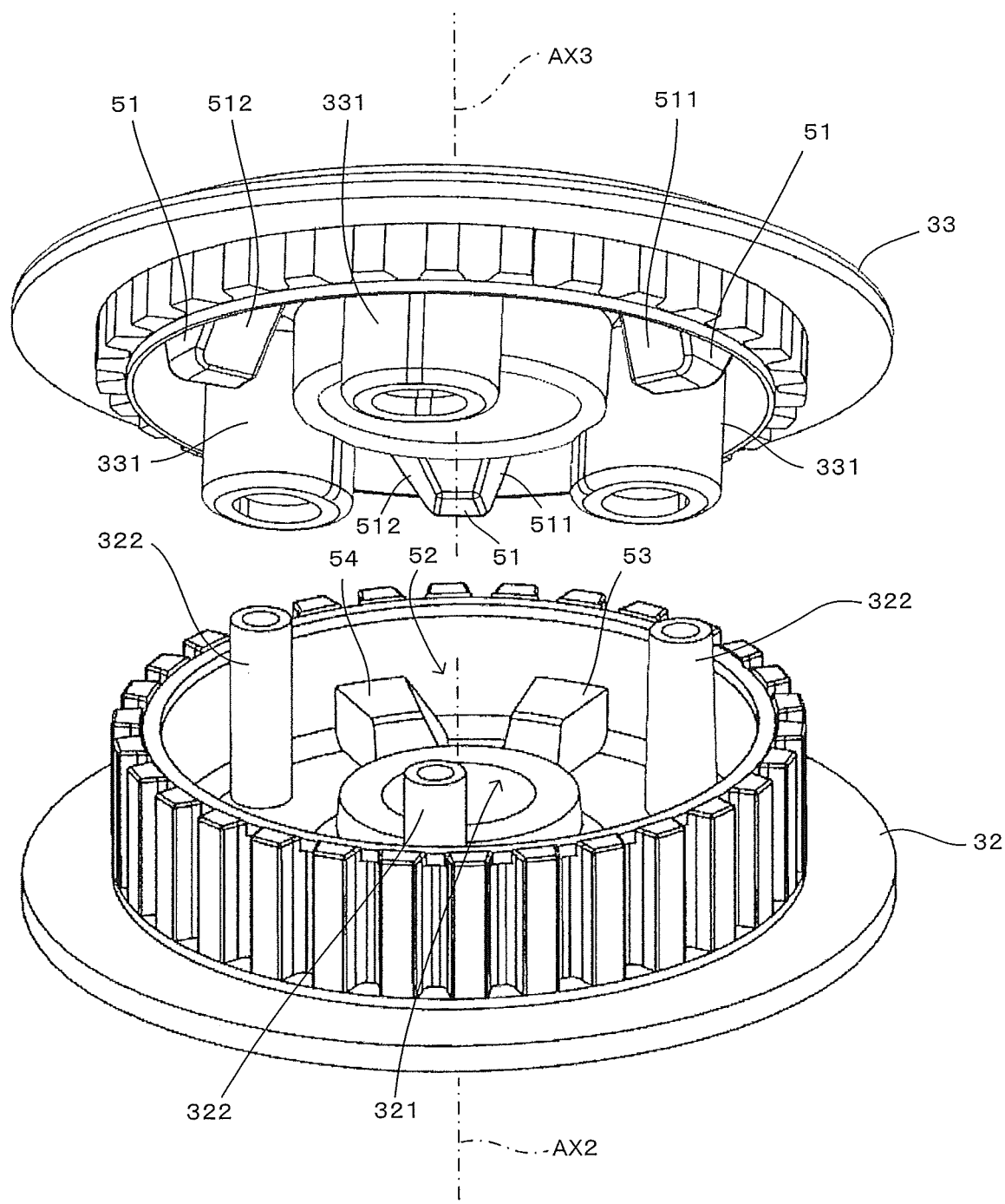
FIG. 3 is a view showing a clutch boss and a pressure section of the clutch device.

FIG. 2 is a sectional view showing one embodiment of the clutch device according to the invention. Further, FIG. 3 is a view showing a clutch boss and a pressure section of the clutch device. The clutch 30 constituting the clutch device 20 includes a clutch housing 31 (driving section) and a clutch boss 32 (driven section) arranged inside the clutch housing 31. A reduction gear 31a is provided in the clutch housing 31 and rotates integrally with a gear (not shown) mounted on the crankshaft 11b. In this embodiment, the clutch 30 is a multi-disc clutch. Specifically, the clutch 30 includes a plurality of friction plates 34 (driving-side frictional member) configured to rotate integrally with the clutch housing 31 and a plurality of clutch plates 35 (driven-side frictional member) configured to rotate integrally with the clutch boss 32. The clutch 30 may be a dry-type clutch or may be a wet-type clutch.

The clutch boss 32 is rotationally symmetrical about an axis of rotation AX2 extending in parallel to an axial direction of the main shaft 39 and finished into such a shape as to be arrangeable inside the clutch housing 31. A fitting hole 321 to which a tip part of the main shaft 39 can be spline-connected and coupled is formed substantially in a center of the clutch boss 32. In this way, if the clutch boss 32 rotates, the main shaft 39 also integrally rotates.

The clutch boss 32 is provided with a plurality of (three in this embodiment) boss sections 322 projecting toward the pressure section 33 to be described next and cam follower pairs 52 (three pairs in this embodiment) of cam mechanisms 50A, 50B. Note that only one of the three cam follower pairs 52 is shown in FIG. 3.

The pressure section 33 is shaped to be rotationally symmetrical about an axis of symmetry AX3 extending in parallel to the axial direction as shown in FIG. 3. The pressure section 33 is provided with a plurality of (three in this embodiment) hollow cylindrical sections 331 and cams 51 (three in this embodiment) of the cam mechanisms. The configurations and operations of the cams and the cam follower pairs constituting the cam mechanisms 50A, 50B are described in detail later.

The hollow cylindrical sections 331 are fitted in a one-to-one correspondence to the boss sections 322 of the clutch boss 32. The hollow cylindrical sections 331 of the pressure section 33 have a hole-shaped cross-section long in a circumferential direction about the axis of symmetry AX3 of the pressure section 33, and the pressure section 33 is slidable in the axial direction relative to the clutch boss 32 and relatively rotatable within an operation range of the cam mechanisms. As shown in FIG. 2, a clutch spring 36 is disposed between the pressure section 33 and the clutch boss 32 to press the pressure section 33 toward the clutch boss 32. Thus, in a state where the driving unit 40 is not actuated, the pressure section 33 is arranged at an engaging position by receiving a spring force of the clutch spring 36 to press the friction plates 34 and the clutch plates 35 toward the clutch boss 32. A torque transmission capacity by the clutch 30, i.e. a torque capacity (engagement degree) changes according to the position of the pressure section 33 at this time. That is, the pressure section 33 is movable between the engaging position where the pressure section 33 is pressed against the plates 34, 35 and a completely open position where the pressure section 33 is not in contact with the plates 34, 35. When the pressure section 33 is at the engaging position, the clutch 30 is in an engaged state (i.e. the torque capacity of the clutch 30 is largest). When the pressure section 33 is at the completely open position, the clutch 30 is in a non-engaged state (i.e. the torque capacity of the clutch 30 is substantially zero).

The driving unit 40 is provided to move the pressure section 33 in the axial direction. The driving unit 40 includes a link mechanism 41 for transmitting the operation of the clutch lever 7 to the pressure section 33. An arm member 411 configured to turn about one of constituent components of the link mechanism 41, i.e. a rotary shaft 412, the rotary shaft 412 being provided rotatably relative to a supporting member while being restrained from rotating relative to a boss section of the arm member 411, and a rack-and-pinion mechanism configured to translate a rotational motion of the rotary shaft 412 into a linear motion to linearly move a movable member 37, are shown in FIG. 2.

Denoted by 414 in FIG. 2 is a gear formed on a lower part of the rotary shaft 412 and meshed with a rack 37a formed on the movable member 37. A rack section of the movable member 37 is supported by the same member as a supporting member of the rotary shaft 412 to be meshed with the gear of the rotary shaft 412 and arranged movably in the axial direction. This movable member 37 is in contact with the pressure section 33 via a bearing 33a mounted in a central part of the pressure section 33 and relatively rotatable with respect to the pressure section 33. Thus, by the rotation of the rotary shaft 412 according to the operation of the clutch lever 7, the movable member 37 and the pressure section 33 are moved in a direction away from the clutch boss 32 and the clutch 30 is set in the non-engaged state. On the contrary, if the operation of the clutch lever 7 is released, the movable member 37 and the pressure section 33 are moved in a direction toward the clutch boss 32 by the spring force of the clutch spring 36 and the clutch 30 is set in the engaged state. Although the clutch 30 is operated by a so-called outer pull method in this embodiment, another method such as an inner push method or an outer push method may be used.

Figure 4:
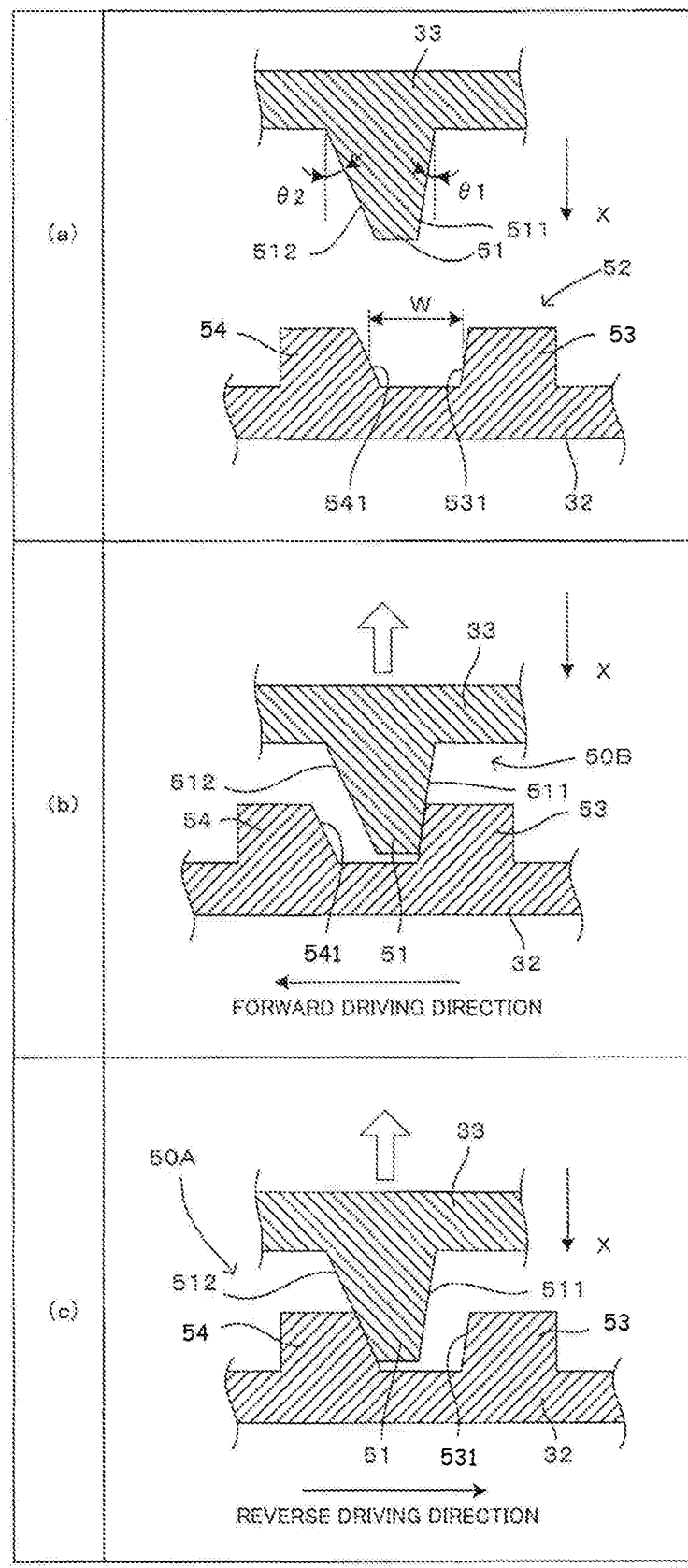
FIG. 4 is a view schematically showing the configurations and operations of the cam mechanisms.
Figure 5:
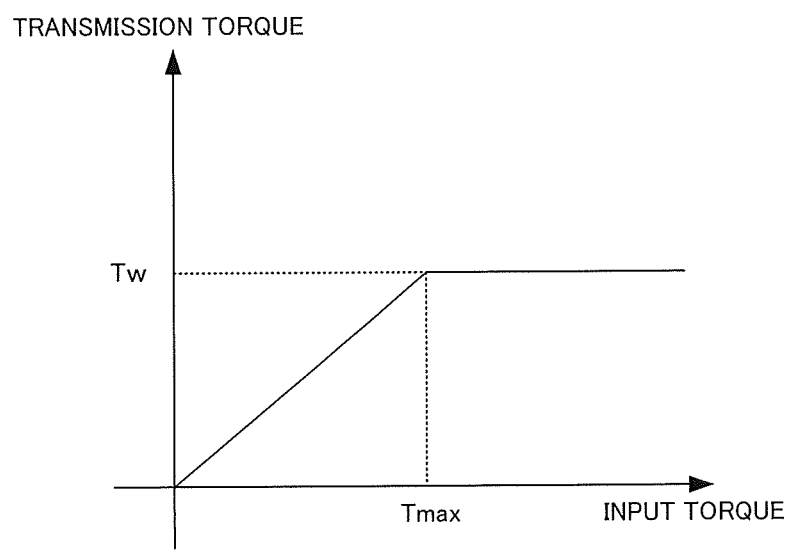
FIG. 5 is a graph showing a transmission torque characteristic in relation to an input torque in the clutch device according to this embodiment.

Next, the cam mechanisms 50A, 50B provided in the clutch device 20 are described with reference to FIGS. 3 to 5. FIG. 4 is a view schematically showing the configurations and operations of the cam mechanisms. FIG. 5 is a graph showing a transmission torque characteristic in relation to an input torque in the clutch device according to this embodiment. The clutch device 20 according to this embodiment includes two types of cam mechanisms, i.e. the cam mechanisms 50A functioning as forward driving direction torque limiters to effectively reduce a shock torque generated in the forward driving direction and the cam mechanisms 50B functioning as reverse driving direction torque limiters to reduce a back torque from the main shaft 39.

In this embodiment, three cams 51 project from the pressure section 33 toward the clutch boss 32 as shown in FIG. 3. These three cams 51 are integrally molded to the pressure section 33 at equal angular intervals about the axis of symmetry AX3. These three cams 51 have the same shape. Each cam 51 has a tapered shape in a projecting direction X from the pressure section 33 toward the clutch boss 32, an inclined surface 511 on an upstream side in the forward driving direction (right side in FIG. 4) is formed as a forward driving direction cam surface and an inclined surface 512 on an upstream side in a reverse driving direction (left side in FIG. 4) is formed as a reverse driving direction cam surface. An angle of inclination θ1 of the forward driving direction cam surface 511 to the projecting direction X of the cam 51 and an angle of inclination θ2 of the reverse driving direction cam surface 512 to the projecting direction X are respectively arbitrary, but the angles of inclination θ1, θ2 are positive and satisfy the following relationship in view of characteristics of the shock torque and the back torque in this embodiment:

θ1<θ2.

That is, the forward driving direction cam surface 511 is formed to be steeper than the reverse driving direction cam surface 512 with respect to the projecting direction X of the cam 51. As described next, the capacity of the torque in the forward driving direction acting in response to the shock torque is set larger than that of the torque in the reverse driving direction acting in response to the back torque so that slippage is unlikely to occur at an engine output torque during normal travel.

Further, the cam follower pairs 52 are integrally provided to the clutch boss 32 to face each cam 51. Each cam follower pair 52 includes a forward driving direction cam follower 53 provided on an upstream side in the forward driving direction (right side in FIG. 4) and a reverse driving direction cam follower 54 provided on an upstream side in the reverse driving direction (left side in FIG. 4). The forward driving direction cam follower 53 and the reverse driving direction cam follower 54 are separated from each other. Out of the surface of the forward driving direction cam follower 53, an inclined surface 531 facing the forward driving direction cam surface 511 has the same angle of inclination as the forward driving direction cam surface 511. Thus, as shown in a field (b) of FIG. 4, if a force is applied in the forward driving direction, each cam 51 slides along the forward driving direction cam follower 53 to move the pressure section 33 in a direction opposite to the projecting direction X. In this way, the friction plates 34 and the clutch plates 35 are moved in directions away from each other. This movement amount is less than a movement amount by the driving unit 40 and the state of the friction plates 34 and the clutch plates 35 transitions from the engaged state to a semi-engaged state, i.e. such a state where slippage is caused between the plates 34 and 35.

Figure 6:
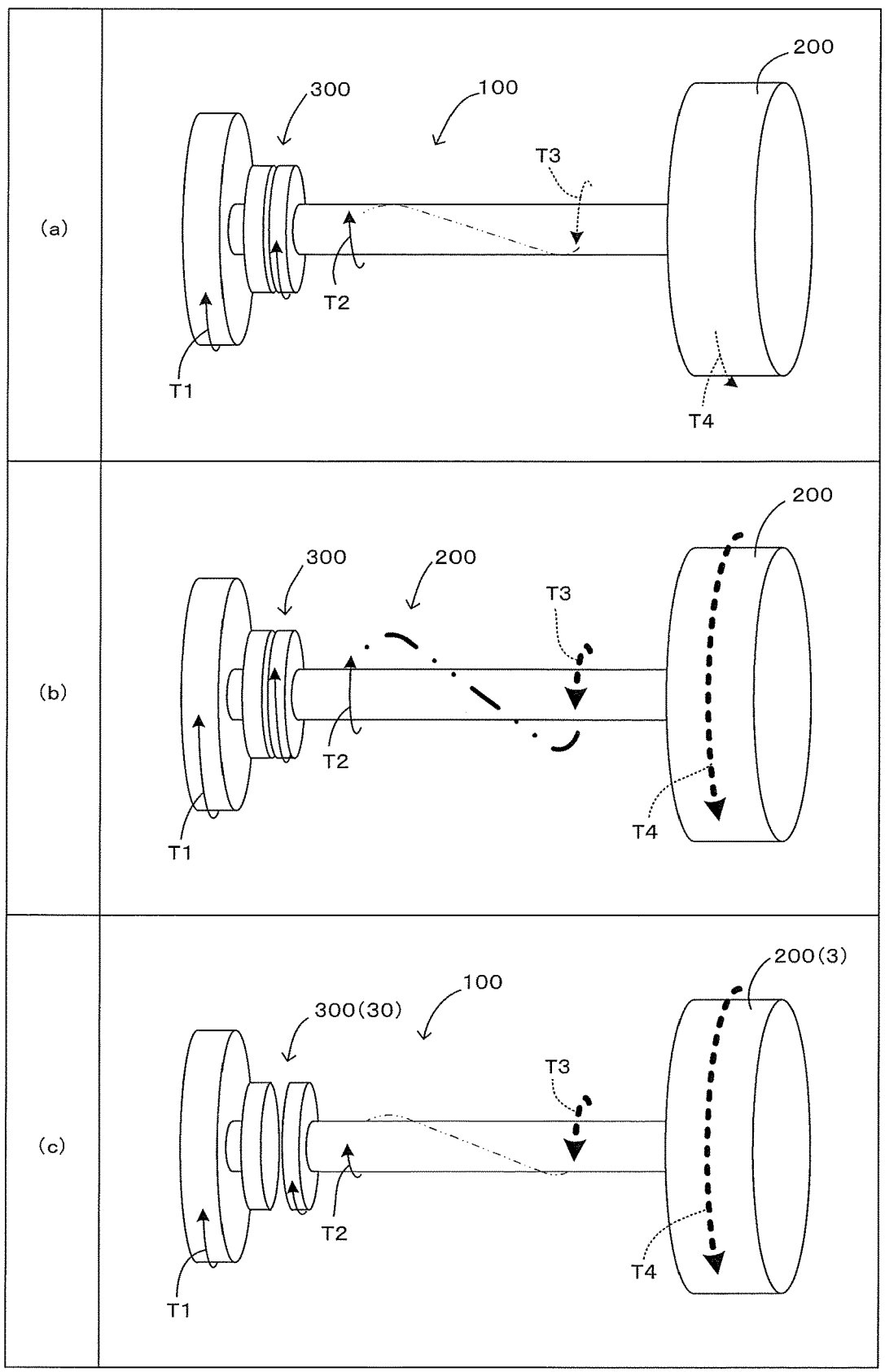
FIG. 6 is a view schematically showing transmission states of a torque among a clutch, a torque transmission path and a rear wheel.

As just described, the cam mechanism 50A is constituted by the cam 51 and the forward driving direction cam follower 53. That is, as shown in FIG. 5, a transmission torque transmitted by the clutch 30 proportionally increases as an input torque increases, but the friction plates 34 and the clutch plates 35 slip on each other by the action of the cam mechanisms 50A when the transmission torque reaches an upper limit value Tmax. As a result, even if the input torque further increases after reaching the upper limit value Tmax, a drive system load torque is suppressed to the upper limit value Tmax. Thus, even if jump landing or the like is made, e.g. even if an excessive input torque T4 exceeding the upper limit value Tmax is generated in the forward driving direction as schematically shown in a field (c) of FIG. 6, the drive system load torque T3 can be limited. That is, the drive system load torque can be effectively reduced in response to the shock torque generated in the forward driving direction.

The reverse driving direction cam follower 54 is provided to face the forward driving direction cam follower 53 while being separated from the forward driving direction cam follower 53. A separation distance W between the forward driving direction cam follower 53 and the reverse driving direction cam follower 54 is set to correspond to the tapered shape of the cam 51. More specifically, as shown in a field (a) of FIG. 4, the separation distance W becomes shorter along the projecting direction X of the cam 51. If a force in the reverse driving direction (back torque) is applied as shown in a field (c) of FIG. 4, each cam 51 slides along an inclined surface 541 of the reverse driving direction cam follower 54 to move the pressure section 33 in the direction opposite to the projecting direction X. In this way, an impact on the motorcycle 1 by the back torque can be alleviated. In this way, the cam mechanism 50B functioning as a reverse driving direction torque limiter is constituted by the cam 51 and the reverse driving direction cam follower 54.

As described above, according to this embodiment, the cam mechanisms 50A are provided in the clutch device 20 provided in the torque transmission path for transmitting a torque generated by the engine unit 11 to the rear wheel 3 and caused to function as forward driving direction torque limiters. Thus, as shown in FIG. 5, even if a shock torque is generated in the forward driving direction, an excess of the transmission torque beyond the upper limit value Tmax can be limited by the clutch device 20 and the drive system load torque can be effectively reduced in response to the shock torque generated in the forward driving direction by a simple configuration.

Further, it is also conceivable to add a cam damper for damping a shock torque, but the motorcycle 1 equipped with the clutch device 20 according to this embodiment has better functions and effects than a motorcycle equipped with a cam damper. This point is described with reference to FIGS. 5 and 7.

Figure 7:
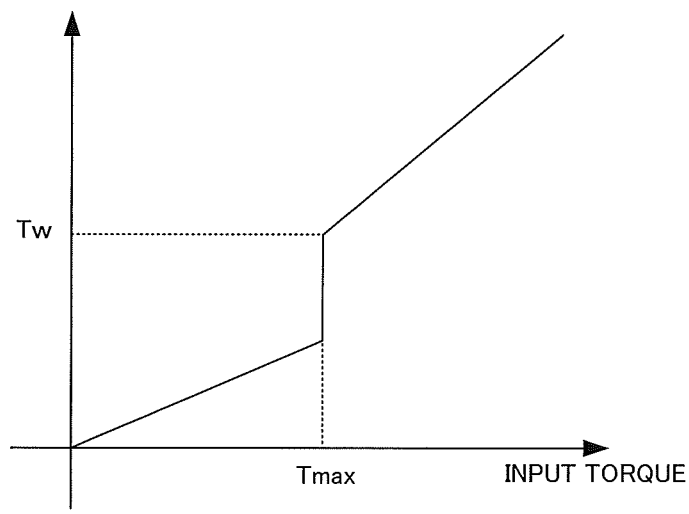
FIG. 7 is a graph showing a characteristic of the transmission torque in response to a varying input torque in the cam damper.

FIG. 7 is a graph showing a characteristic of the transmission torque in response to a varying input torque in the cam damper. As is clear from comparison of FIGS. 7 and 5, if the varying torque exceeds the upper limit value Tmax in the cam damper, a damping effect is lost and the excessive torque directly becomes a drive system load torque. As a result, the breakage of components constituting the torque transmission path may be caused. Contrary to this, in this embodiment, the transmission of the torque exceeding the upper limit value Tmax can be effectively prevented by causing slippage between the plates 34, 35 even if the input torque increases to or above upper limit value Tmax. Thus, it can be reliably prevented that the drive system load torque becomes excessive.

Further, the above functions and effects are obtained only by providing the cam mechanism 50A in the clutch device 20, and a countermeasure to increase the transmission torque capacities of various devices provided in the torque transmission path and additional installation of a cam damper become unnecessary. Thus, according to this embodiment, the enlargement of the motorcycle 1 and a cost increase can be avoided while a shock torque is effectively reduced.

Further, in this embodiment, the cam 51 is shared in juxtaposing the cam mechanisms 50A, 50B. Thus, it is possible to reduce the number of components and simplify the device configuration. Further, the forward driving direction cam surface 511 and the reverse driving direction cam surface 512 are inclined surfaces, and the interval between the forward driving direction cam surface 511 and the reverse driving direction cam surface 512 becomes narrower along the projecting direction X of the cam 51. By adopting such a configuration, the cam mechanism 50A (forward driving direction torque limiter) and the cam mechanism 50B (reverse driving direction torque limiter) can be reduced in size.

Furthermore, in this embodiment, the cam mechanisms 50B are provided in the clutch device 20 to limit not only a force in the forward driving direction, but also a back torque, which is a force in the reverse driving direction. Thus, an impact on the motorcycle 1 due to the back torque can be effectively alleviated. In addition, the angles of inclination θ1, θ2 of the forward driving direction cam surface 511 and the reverse driving direction cam surface 512 can be set independently of each other. Thus, a torque limit by the cam mechanisms 50A, 50B can be made proper.

As just described, in this embodiment, the engine unit 11 and the rear wheel 3 respectively correspond to examples of a "drive source" and a "drive wheel" of the invention, and the torque transmission path is provided to transmit a torque generated by the engine unit 11 to the rear wheel 3. The clutch housing 31 and the clutch boss 32 of the clutch device 20 provided in the torque transmission path respectively correspond to examples of a "driving section" and a "driven section" of the invention. Further, the friction plates 34 and the clutch plates 35 respectively correspond to examples of a "driving-side frictional member" and a "driven-side frictional member" of the invention. Further, the main shaft 39 corresponds to an example of an "output shaft" of the invention. Further, the pressure section 33 and the clutch boss 32 respectively correspond to examples of a "cam mounting section" and a "cam follower mounting section" of the invention.

Note that the invention is not limited to the above embodiment and various changes other than those described above can be made without departing from the gist of the invention. For example, the cams 51 may be provided in the clutch boss 32 and the cam followers 53, 54 may be provided in the pressure section 33. In this case, the pressure section 33 and the clutch boss 32 respectively correspond to examples of the "cam follower mounting section" and the "cam mounting section" of the invention.

Further, although the cam mechanisms 50A (forward driving direction torque limiters) and the cam mechanisms 50B (reverse driving direction torque limiters) are provided in the clutch device 20 in the above embodiment, only the cam mechanisms 50A may be provided in the clutch device 20.

As the specific embodiment has been illustrated and described above, the forward driving direction torque limiter may be, for example, constituted by the cam mechanism provided between the pressure section and the driven section in the present invention. A shock torque in the forward driving direction can be effectively reduced by a simple configuration.

Further, the clutch device is provided in the torque transmission path and a back torque in a direction to accelerate a crankshaft rotational speed of the engine may be transmitted to the clutch device from the engine. Thus, it is preferable to further provide a reverse driving direction torque limiter for moving the driving-side frictional member and the driven-side frictional member in directions away from each other. That is, by adding the reverse driving direction torque limiter, it is not only possible to effectively reduce the shock torque in the forward driving direction, but also to reduce the back torque acting in the reverse driving direction to accelerate the crankshaft rotational speed of the engine from the drive wheel. Also in this case, the driving-side torque limiter and the reverse driving direction torque limiter may be constituted by the cam mechanism provided between the pressure section and the driven section and the shock torque in the forward driving direction and the back torque acting in the reverse driving direction can be effectively reduced by a simple configuration.

Further, in constituting the forward driving direction torque limiter and the reverse driving direction torque limiter by the cam mechanism, one of the pressure section and the driven section may be the cam mounting section and the other may be the cam follower mounting section, and the forward driving direction cam surface and the reverse driving direction cam surface of the cam provided in the cam mounting section may be configured to slide along the forward driving direction cam follower and the reverse driving direction cam follower provided in the cam follower mounting section. By sharing one cam in this way, the device configuration can be simplified. In this case, preferably, the cam projects from the cam mounting section toward the cam follower mounting section, the forward driving direction cam surface and the reverse driving direction cam surface are inclined surfaces and an interval between the forward driving direction cam surface and the reverse driving direction cam surface becomes narrower along a projecting direction of the cam. By adopting such a configuration, the forward driving direction torque limiter and the reverse driving direction torque limiter can be reduced in size.

Note that angles of inclination of the forward driving direction cam surface and the reverse driving direction cam surface to the projecting direction of the cam are arbitrary and the cam surfaces both on the driving side and on the driven side can be optimized by setting the angle of inclination for each cam surface. For example, considering characteristics of a shock torque in the forward driving direction and a back torque acting in the reverse driving direction, an absolute value of the angle of inclination of the forward driving direction cam surface is preferably set smaller than that of the angle of inclination of the reverse driving direction cam surface. By such a configuration, a shock torque in the forward driving direction can be reduced with excellent responsiveness.

This invention can be applied to a clutch device provided in a torque transmission path for transmitting a torque generated by a drive source to a drive wheel and configured to switch the transmission and cut-off of the torque and straddle-type vehicles in general equipped with this clutch device.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A clutch device provided in a torque transmission path for transmitting a torque generated by a drive source to a drive wheel, and configured to switch a transmission and cut-off of the torque, comprising:
   a driving section configured to rotate by receiving the torque;
   a driven section configured to rotate integrally with an output shaft;
   a driving-side frictional member held in the driving section;
   a driven-side frictional member held in the driven section;
   a pressure section configured to press the driving-side frictional member and the driven-side frictional member into contact with each other;
   a forward driving direction torque limiter configured to limit a transmission torque transmitted in a direction to accelerate the output shaft so that the transmission torque does not increase beyond an upper limit value even if an input torque increases beyond the upper limit value, by moving the driving-side frictional member and the driven-side frictional member in directions away from each other in response to an increase of the transmission torque; and
   a reverse driving direction torque limiter configured to move the driving-side frictional member and the driven-side frictional member in the directions away from each other when a back torque is transmitted from the output shaft;
   wherein
   the forward driving direction torque limiter and the reverse driving direction torque limiter are provided respectively on the driven section and the pressure section, between the driven section and the pressure section, and form a cam mechanism including a cam having a forward driving direction cam surface and a reverse driving direction cam surface, and
   the forward driving direction cam surface and the reverse driving direction cam surface are inclined surfaces.

2. The clutch device according to claim 1, wherein:
   one of the pressure section and the driven section is a cam mounting section and another of the pressure section and the driven section is a cam follower mounting section;
   the cam is provided in the cam mounting section; and
   the cam mechanism further includes a forward driving direction cam follower and a reverse driving direction cam follower provided in the cam follower mounting section and configured to move the driving-side frictional member and the driven-side frictional member in the directions away from each other by the forward driving direction cam surface and the reverse driving direction cam surface of the cam respectively sliding along the forward driving direction cam follower and the reverse driving direction cam follower.

3. The clutch device according to claim 2, wherein:
the cam projects from the cam mounting section toward the cam follower mounting section; and
an interval between the forward driving direction cam surface and the reverse driving direction cam surface becomes narrower along a projecting direction of the cam.

4. The clutch device according to claim 3, wherein an angle of inclination of the forward driving direction cam surface to the projecting direction of the cam is smaller than an angle of inclination of the reverse driving direction cam surface to the projecting direction of the cam.

5. The clutch device according to claim 2, wherein the forward driving direction torque limiter is configured to cause the driving-side frictional member and the driven-side frictional member to slip on each other by an action of the cam mechanism in response to the transmission torque reaching the upper limit value.

6. A straddle-type vehicle, comprising the clutch device according to claim 1.

7. A vehicle, comprising the clutch device according to claim 1.

8. The clutch device according to claim 1, wherein a capacity of the transmission torque in the direction to accelerate the output shaft is set to be larger than a capacity of a transmission torque in a reverse driving direction opposite to the direction to accelerate the output shaft.

9. The clutch device according to claim 1, wherein both of a force in a reverse driving direction and a force in a forward driving direction cause the pressure section to move in a direction opposite to a projection direction of the cam.

10. The clutch device according to claim 1, wherein
the pressure section includes cylindrical sections projecting toward the driven section; and
the driven section includes boss sections projecting toward the pressure section.

11. The clutch device according to claim 10, wherein
the cylindrical sections are hollow and fitted in a one-to-one correspondence with the boss sections.

* * * * *